United States Statutory Invention Registration [19]

[11] Reg. Number: H2

Soloway [45] Published: Dec. 3, 1985

[54] VIDEO DISPLAY SYSTEM WITH INCREASED HORIZONTAL RESOLUTION

[75] Inventor: Gerald S. Soloway, Holmdel, N.J.

[73] Assignee: AT&T Technologies Incorporated, Berkeley Heights, N.J.

[21] Appl. No.: 559,630

[22] Filed: Dec. 9, 1983

[51] Int. Cl.[4] ..... G09G 1/28; G09G 1/14

[52] U.S. Cl. ..... 340/701; 340/703; 340/721; 340/748

[58] Field of Search ..... 340/701, 703, 728, 748, 340/750, 721, 724

[56] References Cited

U.S. PATENT DOCUMENTS

| | | | |
|---|---|---|---|
| 3,680,076 | 7/1972 | Duffek et al. | 340/728 |
| 4,208,719 | 6/1980 | Lotz et al. | 340/728 X |
| 4,217,577 | 8/1980 | Roe et al. | 340/750 X |
| 4,298,867 | 11/1981 | Craig | 340/728 |
| 4,342,990 | 8/1982 | Traster | 340/724 |
| 4,371,872 | 2/1983 | Rossman | 340/728 |
| 4,386,349 | 5/1983 | Granberg et al. | 340/728 X |
| 4,400,791 | 8/1983 | Kitado | 340/728 X |
| 4,481,509 | 11/1984 | Sasaki et al. | 340/728 |

OTHER PUBLICATIONS

*A Random-Access Video Frame Buffer*, J. T. Kajiya, I. E. Sutherland, E. C. Cheadle, May 14–16, 1975, pp. 1–6; Publ. by IEEE Comput Soc.

*Primary Examiner*—Thomas H. Tarcza
*Assistant Examiner*—Ian J. Lobo
*Attorney, Agent, or Firm*—Samuel R. Williamson

[57] ABSTRACT

An arrangement is described which multiplies the apparent horizontal resolution of color video display systems without requiring that the video memory in the system be multiplied equivalently. The arrangement may advantageously comprise any given number of bits per picture element for defining a displayable number of colors. One or more additional bit(s) per picture element is provided to convey positional information used for determining the location in a display at which the bits of color information are displayed. The additional memory requirement is limited to this one or more additional bits for each picture element in the display, instead of having the effect of multiplying the number of bits stored per PEL.

11 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VIDEO DISPLAY SYSTEM WITH INCREASED HORIZONTAL RESOLUTION

BACKGROUND OF THE INVENTION

1. Technical Field

This invention relates to video display systems and, more particularly, to an arrangement for improving the resolution of such systems.

2. Description of the Prior Art

Various information display systems have been proposed and used heretofore employing interactive computer systems wherein the user manipulates the information stored in or generated by a computer. This information may constitute text, graphics, facsimile, video and the like. In the recent past, the advent of very large scale integrated circuitry has made possible the wide use of low cost microprocessor systems. It is now considered cost effective to maintain central databases from which information can be accessed with such a system by the general public.

Two information display systems using central databases, viewdata and teletext, are presently being introduced in the telecommunications industry and have a potential for wide use. In the viewdata system, the consumer is provided a two-way interactive service capable of displaying pages of text and pictorial materials on a video display. In the teletext system, the consumer is provided with a one-way broadcast information service for displaying pages of text and graphic material on a video display.

In both the viewdata and teletext systems, it is necessary to include some type of electronics module at the consumer end with the display control information. One example of such a module is shown in U.S. Pat. No. 4,396,989, issued to J. R. Fleming et al. on Aug. 2, 1983, and is incorporated herein by reference. This type of module provides control to the consumer's display terminal (such as an ordinary television set) for assembling and displaying text and graphic information.

A common approach for displaying such text and graphic information is to use video display circuitry with a local video memory commonly referred to as a bit plane memory or full frame buffer. In that typical display terminals are configured to be refreshed on the order of 60 times per second, the local memory containing a description of the image can be maintained by external circuitry conveniently located in the electronic module. This avoids the need to rebroadcast the content of each screen full of information continuously, which, incidentally, requires very high bandwidth.

In presently existing viewdata and teletext systems utilizing a full frame buffer, the video memory is normally designed to have a given number N of bits per picture element (PEL) and hence be capable of displaying $2^N$ colors. If a display of H horizontal PELs by V vertical PELs is desired, a video memory of $N \times H \times V$ bits would be required. And if a display having a horizontal resolution of 2H is desired, twice as many bits would be required in the video memory.

The horizontal resolution of existing display devices is not easily expanded since the frequency of the horizontal scan is limited. This has led designers to constrain the number of horizontal PELs for display on a home television receiver to approximately 256, even though the display tube is capable of greater resolution. It is desirable, therefore, to be able to increase the horizontal resolution of a display device and thereby more fully utilize its resolution capability, but at the same time avoid the normal corresponding increases in horizontal frequency scan and video memory requirement.

SUMMARY OF THE INVENTION

In accordance with the present invention, an arrangement is provided which multiplies the apparent resolution of color video display systems without requiring that the size of the video memory be multiplied equivalently. This arrangement requires that one or more data bits be added to the video memory for each PEL in the display. With the additional one or more data bits, the decoding logic determines if the color information represented by the bits for the horizontal and vertical PELs is to be displayed on an existing boundary, as it would normally be without this arrangement, or be delayed by a fraction of the PEL clock cycle and plotted on an offset boundary.

BRIEF DESCRIPTION OF THE DRAWING

This invention will be more fully comprehended from the following description and the accompanying drawing in which.

DETAILED DESCRIPTION

A common approach to displaying color images in a video display system is to have a description of the image maintained by a local memory. This local memory is conveniently associated with a display terminal and is usually referred to as video memory. In a bit plane or full frame buffer, the memory is organized to correspond on a one-for-one basis with the PELs in the display. For instance, if it is desirable to display an image using 256 horizontal PELs, by 200 vertical PELs in 16 colors, a memory organized as $256 \times 200$ addresses is typically used, where each address accesses 4 bits ($2^4 = 16$). Synchronization and decoding logic sequentially accesses these memory locations in a read cycle of a reference clock. The 4-bit output is decoded by video drive circuitry during each read cycle into the color information signals required by the display terminal (for example, red, green and blue voltage levels).

Figure 1:
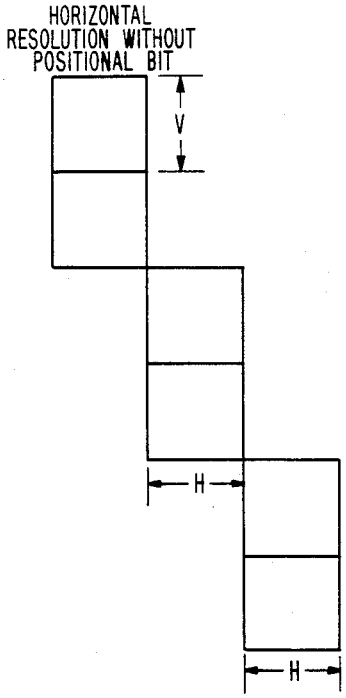
FIG. 1 shows the detail of an arbitrary line segment of PELs drawn using a standard bit plane.

Referring now to FIG. 1, there is shown a detail of an arbitrary line segment of PELs drawn using the conventional bit plane. In this figure, for each two vertical steps of V, a horizontal step H of the same size is taken resulting in a very jagged looking line. Thus, the resolution of the conventional bit plane limits the smoothness with which this image may be drawn.

Figure 2:
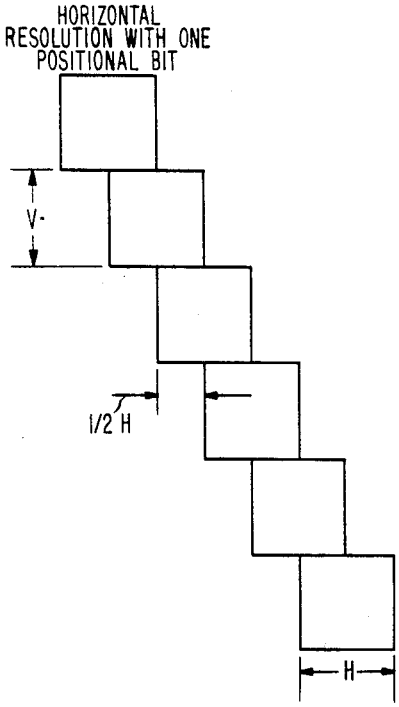
FIG. 2 shows the detail of an arbitrary line segment of PELs drawn in accordance with one arrangement of the present invention.

FIG. 2 shows the detail of an arbitrary line segment of PELs drawn in accordance with the present invention with one bit added to the bit plane for each PEL. Although vertical steps of V remain the same size as before, the horizontal step size H is reduced by half, resulting in a much smoother looking image. Without this arrangement, the resolution in the horizontal direction would have to be doubled in order to achieve the same results. This is easily illustrated by reference to the earlier mentioned design example for displaying an image using 256 horizontal PELs by 200 vertical PELs in 16 colors. In that example, the memory required is $256\times200\times4$ which is 204,800 bits. To obtain the same horizontal resolution with known arrangements, the memory size would have to double to $512\times200\times4$ which is 409,600 bits. With the new arrangement, however, the memory is $256\times200\times5$ or 256,000 bits, or only a 25-percent increase instead of 100 percent. The impact is even greater when more colors are used. For a display system using 256 colors and requiring 8 bits per PEL, the increment for the present arrangement is only 12.5 percent.

The additional bit is not used to describe color information, but rather is used to convey positional information as to how the bits of color information are to be interpreted. Positional information for a display is typically determined by the synchronization and decoding circuitry instead of being stored in a bit plane. In this arrangement, the additional bit is also located in the bit plane and is used by decoding logic to determine if the color information represented by the bits for the horizontal and vertical PELs is to be displayed on an existing boundary, as they would be in a conventional arrangement, or whether the color information should be delayed by a fraction of the PEL clock cycle and plotted on an offset boundary.

Figure 3:
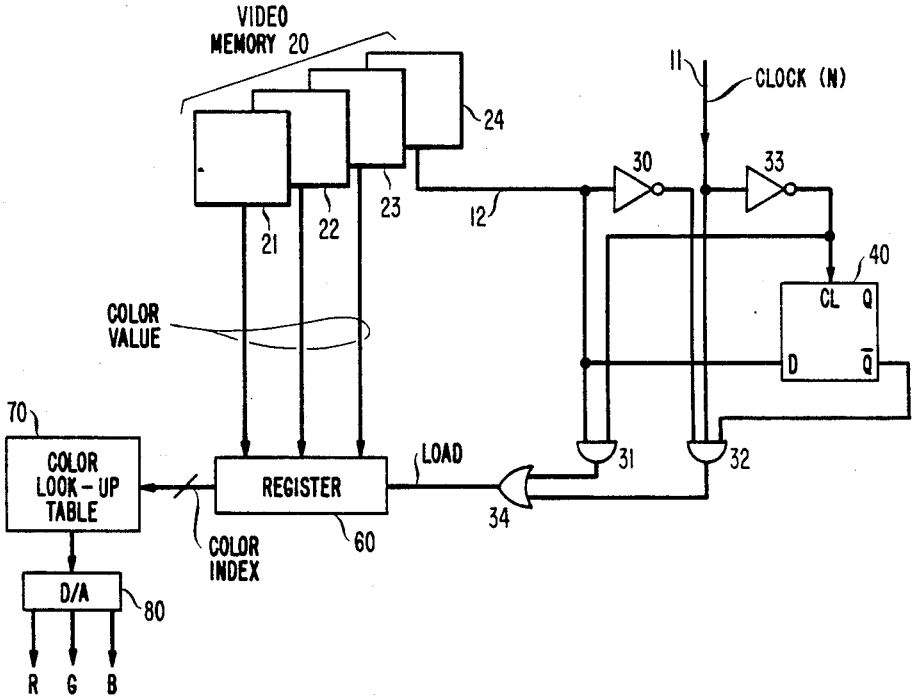
FIG. 3 shows a schematic circuit diagram suitable for adapting an information display system for operation in accordance with the present invention.

The circuit logic necessary to incorporate the present arrangement in an information display system is minimal and is illustrated in FIG. 3 for the case of one additional bit per PEL. Moreover, the additional logic provides the added benefit of ensuring that a given color index output is always present for a minimum of one clock cycle. This increased dwell time is often necessary to ensure that the frequency response of the visual display device (e.g., a TV receiver) is not exceeded.

With reference now to FIG. 3, a reference clock signal running at the PEL rate of N number of PELs per second is available on line 11 from the usual timing and synchronization circuits of an information display system. It is assumed that these circuits and decoding circuitry are also addressing the video memory 20 sequentially in synchronism with this clock signal, and that the output of the bit planes 21 through 24 is stable prior to the rising edge of the clock signal. This is easily achieved by delaying the clock signal on line 11 a little from the clock used to generate the memory addresses.

Positional information determining how the bits of color information should be interpreted is contained in bit plane 24 and provided over line 12 to an inverter 30, one of the two inputs of AND gate 31 and a flip-flop 40. When the positional information signal on line 12 is zero, AND gate 32 will have as inputs a logic one signal from inverter 30, the clock signal on line 11 and the $\overline{Q}$ output of D flip-flop 40. The clock signal on line 11 is also provided to the clock input of flip-flop 40 and the remaining input of AND gate 31 via inverter 33.

The positional information existing during each preceding clock cycle is reflected in the Q output of flip-flop 40. If $\overline{Q}$ is a logic one, reflecting that during the previous clock cycle the signal on line 12 was zero, then the output of AND gate 32 will go high during the rising edge of the clock signal and the appropriate color value will be loaded into register 60 via OR gate 34. The output of register 60 provides color index information to a color lock-up table 70 where the appropriate color is selected. A digital-to-analog converter 80 converts the digital output of the look-up table 70 to an analog signal used for driving the red, blue and green guns of a cathode ray tube display (not shown).

If the positional information signal on line 12 is a logical one, then the output of AND gate 31 will also go to a logic one at the middle of the clock cycle, loading the data into register 60 one-half clock cycle later than it would have if the positional information signal was a logic zero. If the positional information signal was logic one on the previous cycle, and is logic zero on the current cycle, no new color information is loaded. A truth table showing the effect of this logic on the output of register 60 is shown below where i is the current clock cycle and i-1 the previous. $P_i$ is the positional bit output during clock cycle i, and $V_i$ is the color value output during cycle i.

| | | Color Index | | | |
|---|---|---|---|---|---|
| $P_i$ | $P_{i+1}$ | Cycle i | | Cycle i + 1 | |
| 0 | 0 | $V_i$ | $V_i$ | $V_{i+1}$ | $V_{i+1}$ |
| 0 | 1 | $V_i$ | $V_i$ | $V_i$ | $V_{i+1}$ |
| 1 | 0 | $V_{i-1}$ | $V_i$ | $V_i$ | $V_i$ |
| 1 | 1 | $V_{i-1}$ | $V_i$ | $V_i$ | $V_{i+1}$ |

It should be noted that for case $(P_i, P_{i+1})=(1,0)$, $V_{i+1}$ is never provided as output since to do so, $V_i$ would be provided as output for only one-half a clock cycle during the latter half of cycle i. Should the previously mentioned restriction on the duration of the color index output being at least one cycle not be required for a particular visual display device, then obvious simplifications to the logic and modifications to the truth table are possible.

Figure 4:
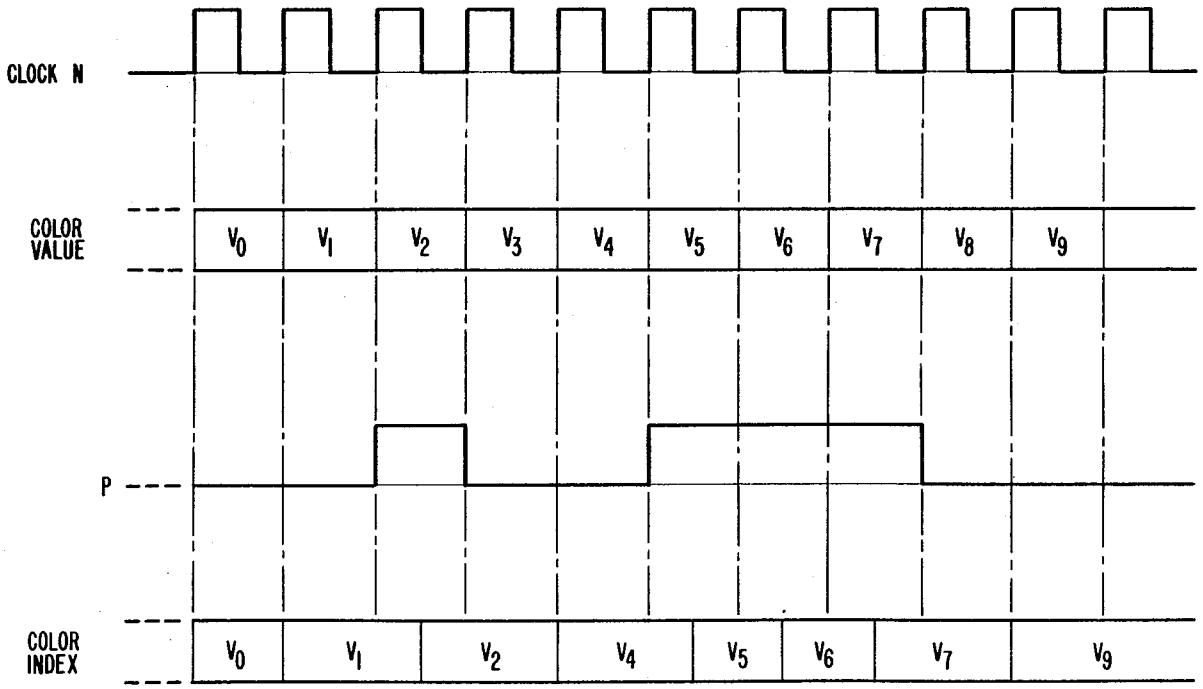
FIG. 4 is a timing diagram depicting waveforms of particular signals employed in this invention.

FIG. 4 represents an illustrative timing diagram depicting waveforms of particular signals employed or generated by the circuit logic shown in FIG. 3. The clock waveform depicts the signal on line 11 from which all of the timing for the logic circuit is derived. Once each clock cycle, a memory address containing a color value (which may be several bits per PEL) and a positional bit P are accessed. As may be seen in FIG. 4, if P is a logic zero, the color value is latched in register 60 at the rising edge of the clock cycle and the color index output occurs approximately coincident with the leading edge of the clock. On the other hand if P is a logic one, the color value is latched at mid-cycle, resulting in the PEL corresponding to that cycle having shifted by ½ PEL. This ability to shift color information by ½ PEL provides the apparent increase in horizontal resolution.

Many modifications of this video display system are possible and may obviously be implemented by those skilled in the art without departing from the spirit and scope of the invention. An example of such a modification is a generalization of the above-described technique which would permit R bits of positional information to be stored for each PEL in the bit plane. These R bits would be sequentially accessed as previously, however, the R bits would be capable of describing $2^R$ possible delays, instead of a single delay of one-half. For example, if R=2, four delays are possible. These would be 0, ¼, ½, and ¾ of a PEL. This would have the effect of increasing the apparent resolution by a factor of 4. If the mentioned design example of a display having $256\times200$ addresses is desired, but with 4 bits per PEL, quadrupling the resolution would require $1024\times200\times4$ which is 819,200 bits. With the new arrangement, $256\times200\times6$ or 307,200 bits are used. It is to be understood, therefore, that within the scope of the appended claims, the invention may be practiced otherwise than as specifically described.

What is claimed is:

1. A video display system for assembling data received from a data source and for displaying this data in the form of color images on a video display, the system comprising:

means for receiving the data from the source;

means for producing color image data having both horizontal and vertical coordinates and horizontal positional offset data representative of the data received; and means for assembling the color image data and the positional offset data such that the positional offset data in a first state provides an offset value for changing the value of the horizontal coordinate of the color image data, and in a second state does not provide an offset value for changing the value of the horizontal coordinate of the color image data, the assembling means providing the offset value to the value of the horizontal coordinate of the color image data by delaying in time the displaying of the color image data in the horizontal direction on the video display.

2. The video display system of claim 1 further including means for storing the color image data and the positional offset data in memory; and means for accessing the memory for refreshing the video display.

3. The video display system of claim 1 wherein the positional offset data comprises one data bit for each of the plurality of horizontal and vertical coordinate positions displayable on the video display.

4. In a video display system for displaying color images on a video display, a display processing unit comprising:

signal generating means for generating color image data having a plurality of both horizontal and vertical coordinates and horizontal positional offset data; and means for assembling the color image data and the positional offset data such that the positional offset data in a first state provides an offset value for changing the value of the horizontal coordinate of the color image data, and in a second state does not provide an offset value for changing the value of the horizontal coordinate of the color image data, the assembling means providing the offset value to the value of the horizontal coordinate of the color image data by delaying in time the displaying of the color image data in the horizontal direction on the video display.

5. The display processing unit of claim 4 further including means for storing the color image data and the positional offset data in memory; and means for accessing the memory for refreshing the video display.

6. The video display system of claim 2 or 5 wherein the memory further comprises a first memory section for storing the color image data, a second memory section for storing the positional offset data, and a shift register for selectively receiving the color image data, the output of the register being responsive to the state of the positional offset data from the second memory section, the positional offset data while in the first state causing a time delay in the displaying of the color image data in the horizontal direction on the video display, and while in the second state not causing a time delay in the displaying of the color image data.

7. The video display system of claim 6 wherein the color image data for each of the plurality of horizontal and vertical coordinates comprise a picture element displayable on a video display.

8. The video display system of claim 7 wherein the time delay comprises one-half of a clock cycle, the clock cycle being the dwell time for the color image data at each horizontal coordinate position.

9. The video display system of claim 8 wherein the positional offset data comprises one data bit for each picture element.

10. A method of assembling data received from a data source and for displaying this data in the form of color images on a video display, the method comprising the steps of:

receiving the data from the course;

producing color image data having both horizontal and vertical coordinates and horizontal positional offset data representative of the data received; and assembling the color image data and the positional offset data such that the positional offset data in a first state provides an offset value for changing the value of the horizontal coordinate of the color image data, and in a second state does not provide an offset value for changing the value of the horizontal coordinate of the color image data, the offset value being provided to the value of the horizontal coordinate of the color image data by delaying in time the displaying of the color image data in the horizontal direction on the video display.

11. The method as defined in claim 10 wherein the assembling step further includes:

storing the color image data and the positional offset data in memory; and accessing the memory for refreshing the video display.

* * * * *